US012424786B2

(12) United States Patent
Ohmura et al.

(10) Patent No.: US 12,424,786 B2
(45) Date of Patent: Sep. 23, 2025

(54) CONNECTOR FITTING STRUCTURE

(71) Applicant: YAZAKI CORPORATION, Tokyo (JP)

(72) Inventors: Takenori Ohmura, Kakegawa (JP); Yoshitaka Tsushima, Kakegawa (JP); Seiji Kozono, Kakegawa (JP); Masaya Okamoto, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 303 days.

(21) Appl. No.: 18/335,104

(22) Filed: Jun. 14, 2023

(65) Prior Publication Data

US 2024/0006800 A1 Jan. 4, 2024

(30) Foreign Application Priority Data

Jun. 30, 2022 (JP) ................................ 2022-106558

(51) Int. Cl.
*H01R 13/502* (2006.01)
*H01R 13/631* (2006.01)
*H01R 13/641* (2006.01)

(52) U.S. Cl.
CPC ......... *H01R 13/502* (2013.01); *H01R 13/631* (2013.01); *H01R 13/641* (2013.01); *H01R 2201/26* (2013.01)

(58) Field of Classification Search
CPC .............. H01R 13/4532; H01R 13/447; H01R 13/453; H01R 13/4536; H01R 13/4538;
(Continued)

(56) References Cited

U.S. PATENT DOCUMENTS 11,715,903 B2 * 8/2023 Kozono ................. H01R 35/04 439/367
11,721,926 B2 * 8/2023 Kozono ............. H01R 13/4532 439/139
(Continued)

FOREIGN PATENT DOCUMENTS

JP 2012-4140 A 1/2012
JP 2016-24952 A 2/2016
WO 2011/051781 A1 5/2011

*Primary Examiner* — Abdullah A Riyami
*Assistant Examiner* — Nader J Alhawamdeh
(74) *Attorney, Agent, or Firm* — KENEALY VAIDYA LLP

(57) ABSTRACT

A connector fitting structure includes: a first connector including: a first housing that accommodates a first connection terminal; and a guide groove provided in the first housing; a second connector including: a second housing that accommodates a second connection terminal; a guide protrusion portion inserted into the guide groove; and a connector cover pivotable between a closed position that covers an opening to an accommodation space for the second connection terminal and an open position that does not cover the opening. The first connector and the second connector are fitted and electrically connected to each other. The guide protrusion portion is provided on the connector cover, accommodated in the second housing when the connector cover is in the closed position, and exposed outside the second housing and extended along a fitting direction of the first connector and the second connector when the connector cover is in the open position.

5 Claims, 9 Drawing Sheets

(58) Field of Classification Search
CPC ... H01R 13/5213; H01R 13/631; B60L 53/16; Y02T 10/70
See application file for complete search history.

(56) References Cited

U.S. PATENT DOCUMENTS

| | | | | |
|---|---|---|---|---|
| 12,095,195 | B2 * | 9/2024 | Kozono | H01R 13/4534 |
| 12,095,196 | B2 * | 9/2024 | Kozono | H01R 13/5213 |
| 12,218,453 | B2 * | 2/2025 | Kozono | B60L 53/16 |
| 12,266,890 | B2 * | 4/2025 | Kozono | H01R 13/631 |
| 2018/0309222 | A1 * | 10/2018 | Ferran Palau | H01R 13/629 |
| 2024/0006800 | A1 * | 1/2024 | Ohmura | H01R 13/631 |

* cited by examiner

CONNECTOR FITTING STRUCTURE

CROSS-REFERENCE TO RELATED APPLICATION(S)

This application is based upon and claims the benefit of priority from prior Japanese patent application No. 2022-106558 filed on Jun. 30, 2022, the entire contents of which are incorporated herein by reference.

BACKGROUND

1. Field of the Invention

The present disclosure relates to a connector fitting structure.

2. Description of the Related Art

In recent years, a wire harness (electric wire) for electrically connecting various electrical components mounted in an automobile or the like is connected by a connector. To fit such a connector well, it is conceivable to apply a connector guide mechanism described in JP2016-24952A, for example.

The connector guide mechanism includes a plug, a socket, a plug-side guide, and a socket-side guide, in which the plug-side guide and the socket-side guide are provided with a positioning portion for aligning tip portions of the plug and the plug-side guide to predetermined positions around an axial direction when the plug is inserted into the socket. The positioning portion includes a protrusion portion formed at a tip portion of the plug-side guide, and a groove formed in an opening portion of the socket-side guide such that the protrusion portion enters inside. With such configuration, the positioning portion regulates the tip portions of the plug and the plug-side guide in a normal direction, so even when a central axis direction of the plug and a central axis direction of the socket are in an inclined relationship, the plug can be inserted and removed favorably.

However, in the connector guide mechanism disclosed in JP2016-24952A, since the protrusion portion of the plug-side guide is always exposed, there is a possibility that the protrusion portion may be damaged or foreign matter may be adhered thereto to cause interference with fitting, or there is a possibility that foreign matter adhering to the protrusion portion may enter the socket.

SUMMARY

The present disclosure is made in view of the circumstances described above, and an object of the present disclosure is to provide a connector fitting structure capable of protecting a protrusion portion for fitting guide.

According to an aspect of the present disclosure, there is provided a connector fitting structure including: a first connector including: a first housing that accommodates a first connection terminal; and a guide groove provided in the first housing; a second connector including: a second housing that accommodates a second connection terminal; a guide protrusion portion that is inserted into the guide groove; and a connector cover pivotable between a closed position that covers an opening to an accommodation space for the second connection terminal of the second housing and an open position that does not cover the opening, in which: the first connector and the second connector are fitted and electrically connected to each other; and the guide protrusion portion is provided on the connector cover, accommodated in the second housing when the connector cover is in the closed position, and exposed outside the second housing and extended along a fitting direction of the first connector and the second connector when the connector cover is in the open position.

According to the connector fitting structure of the present disclosure, it is possible to protect the protrusion portion for fitting guide.

The present disclosure is briefly described above. Details of the present disclosure will be further clarified by reading the following description of embodiments (hereinafter referred to as "embodiment") with reference to the accompanying drawings.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein.

DETAILED DESCRIPTION OF THE INVENTION

Specific embodiments relating to the present disclosure will be described below with reference to each drawing.

First Embodiment

Figure 1:
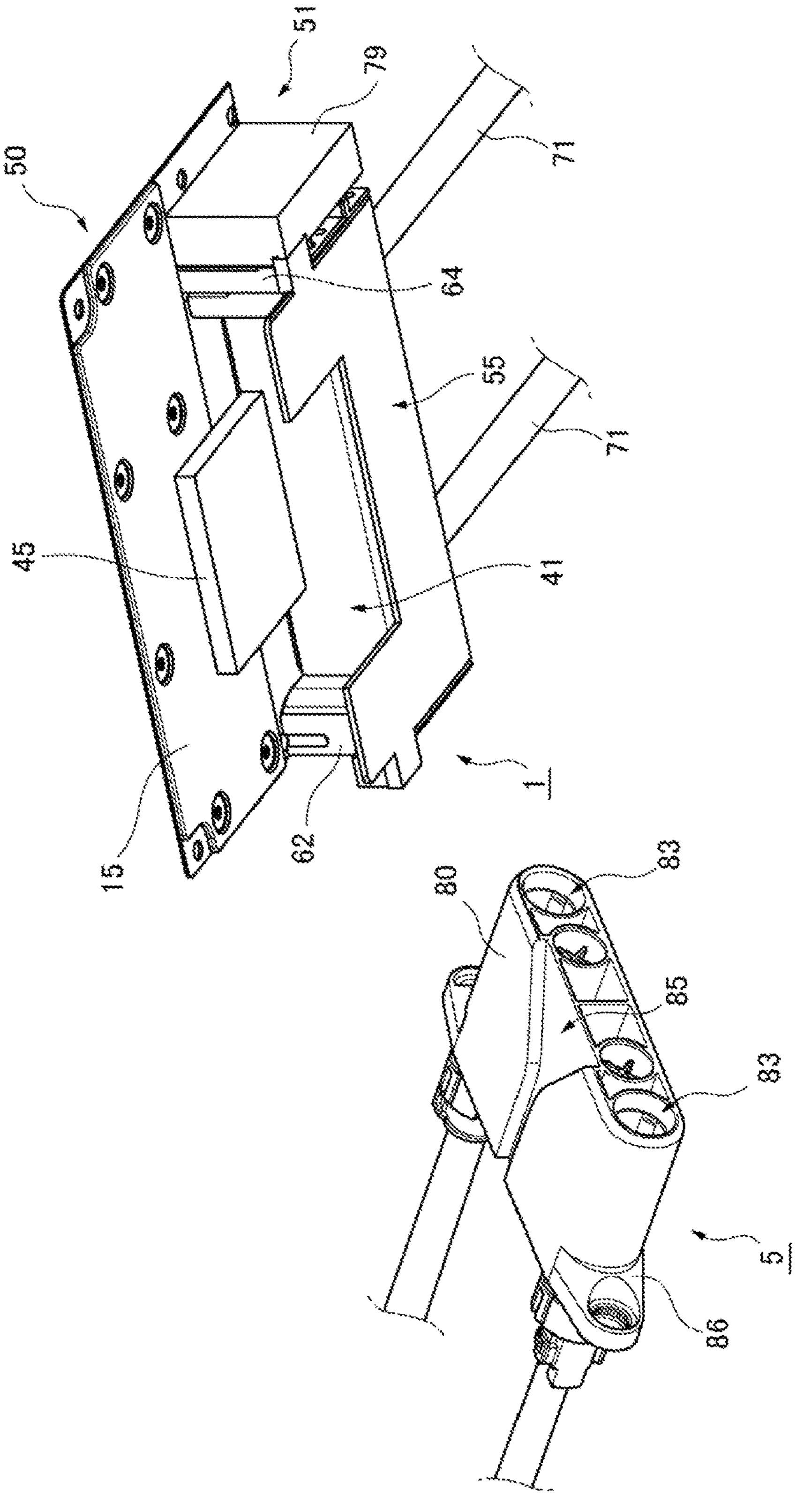
FIG. 1 is a perspective view illustrating an inlet as an example of a second connector and an inlet plug as an example of a first connector fitted to the inlet which form a connector fitting structure according to a first embodiment of the present disclosure.
Figure 2:
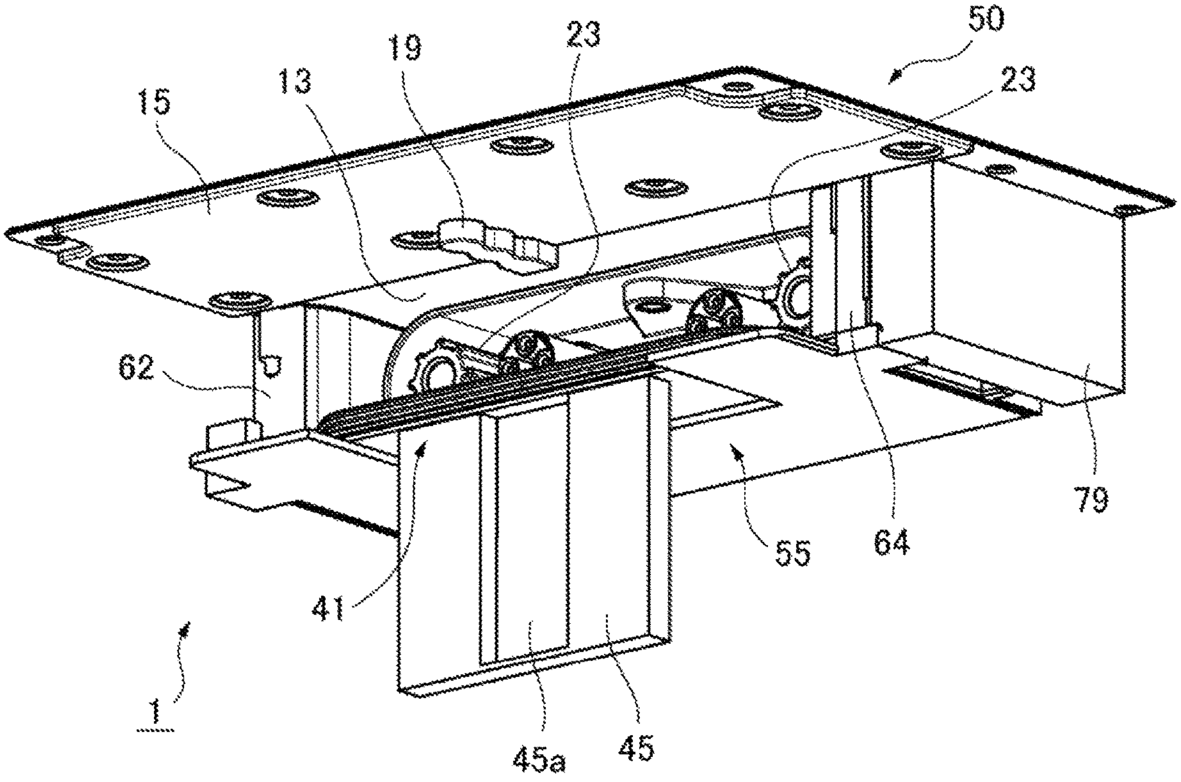
FIG. 2 is a perspective view illustrating a state in which a connector cover of the inlet illustrated in FIG. 1 is opened.
Figure 3:
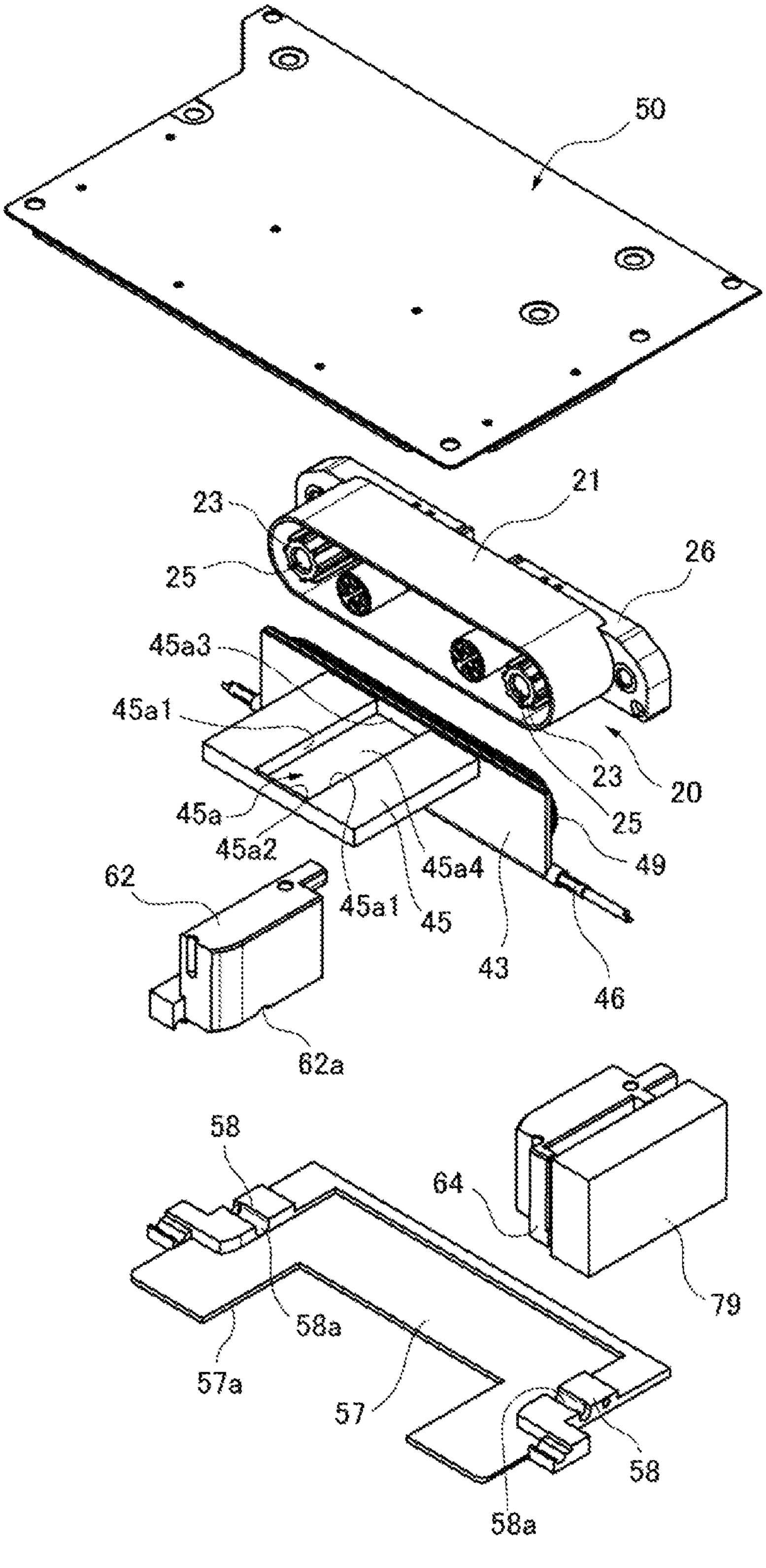
FIG. 3 is an exploded perspective view of the inlet illustrated in FIG. 1.

FIG. 1 is a perspective view illustrating an inlet 1 as an example of a second connector and an inlet plug 5 as an example of a first connector fitted to the inlet 1 which form a connector fitting structure according to a first embodiment of the present disclosure. FIG. 2 is a perspective view illustrating a state in which a connector cover 41 of the inlet 1 illustrated in FIG. 1 is opened. FIG. 3 is an exploded perspective view of the inlet 1 illustrated in FIG. 1.

As illustrated in FIGS. 1 to 3, the inlet 1 includes a housing 20 that accommodates a connection terminal (second connection terminal), an outer case 51 that accommodates and holds the housing 20, a pick-up rib 19, and the connector cover 41 provided integrally with a pick-up rib cover portion 45*a*. The outer case 51 is an example of a second housing. The pick-up rib 19 is an example of a guide protrusion portion. The pick-up rib cover portion 45*a* is an example of a guide protection portion. The pick-up rib 19 is provided on the outer case 51 and inserted into a fitting guide groove 85 as an example of a guide groove. The pick-up rib 19 is formed with a plurality of recess portions on tip sides of both side surfaces facing groove side surfaces of the fitting guide groove 85. The fitting guide groove 85 is provided in a plug housing 80 of the inlet plug 5. The pick-up rib cover portion 45*a* is provided integrally with the connector cover 41 and covers the pick-up rib 19 when the connector cover 41 is at a closed position, whereas the pick-up rib cover portion 45*a* does not cover the pick-up rib 19 when the connector cover 41 is at an open position.

In the specification, a front-rear direction is a direction along a connector fitting direction (left-right direction in FIG. 4) of the housing 20 and a side where the plug housing 80 of the inlet plug 5 is fitted is defined as a front side. An up-down direction is a direction (up-down direction in FIG. 4) perpendicular to the connector fitting direction of the housing 20 and a top plate 50 side of the outer case 51 is defined as an upper side.

The housing 20 of the inlet 1 is molded from electrically insulating synthetic resin. The housing 20 includes a pair of terminal accommodation cylindrical portions 23 and 23 protruding toward the inlet plug 5 side, a hood portion 21 having a hollow cylindrical shape and covering the pair of terminal accommodation cylindrical portions 23 and 23, and a rear wall 26 provided with the pair of terminal accommodation cylindrical portions 23 and 23 and covering the rear of the hood portion 21.

A connection terminal connected to a terminal portion of a high-voltage cable 71 is accommodated in the terminal accommodation cylindrical portion 23. The high-voltage cable connected to the connection terminal is pulled out from a rear end opening of the terminal housing cylindrical portion 23.

A front opening 25 into which a connection terminal (first connection terminal) of the inlet plug 5 is inserted is formed at a front end of the terminal accommodation cylindrical portion 23. The front opening 25 is an example of an opening to a connection terminal accommodation space of the housing 20.

The outer case 51 is a flat housing composed of a bottom portion 55, side wall members 62 and 64, and the top plate 50.

The bottom portion 55 is integrally formed with a bottom plate portion 57 and a pair of support portions 58 and 58. The bottom plate portion 57 is a flat plate one size smaller than the top plate 50. The bottom plate portion 57 includes an opening 57*a* having a rectangular shape in a central portion on the front side, and exhibits a U shape in plan view. The pair of support portions 58 are provided at both left and right end portions of an upper surface of the bottom plate portion 57, and support a pivoting shaft 46 of the connector cover 41 placed in recess portions 58*a* having a substantially semi-cylindrical shape and provided on the upper surface.

The side wall members 62 and 64 are disposed on both left and right sides of the housing 20 and serve as both side walls of the outer case 51. A lower surface of the side wall member 62 is provided with a recess portion 62*a* having a substantially cylindrical shape, and a lower surface of the side wall member 64 is provided with a recess portion (not illustrated) similar to the recess portion 62*a*. One end portion (left end portion) of the pivoting shaft 46 of the connector cover 41 is supported between the recess portion 58*a* and the recess portion 62*a* having a substantially semi-cylindrical shape and provided on the lower surface of the side wall member 62. The other end portion (right end portion) of the pivoting shaft 46 is similarly supported between the recess portion 58*a* and the recess portion provided on the lower surface of the side wall member 64. An actuator 79 for rotationally driving the pivoting shaft 46 is screwed to a right side surface of the side wall member 64.

The top plate 50 includes an eaves portion 15 extending in front of a top wall portion 13 that defines a housing accommodation space together with the bottom plate portion 57 and the side wall members 62 and 64.

The pick-up rib 19 for guiding the fitting of the plug housing 80 of the inlet plug 5 into the housing 20 accommodated in the outer case 51 extends along the connector fitting direction on a lower surface of a central portion of the eaves portion 15.

The pick-up rib 19 has a rounded tip and a substantially rectangular parallelepiped shape of which a length in the connector fitting direction is longer than a length in the left-right direction. The pick-up rib 19 includes a plurality of recess portions formed at predetermined intervals on both left and right side surfaces on the front side. The predetermined interval is appropriately determined considering a size of the pick-up rib 19, a size of the fitting guide groove 85, and the like.

The connector cover 41 includes a cover portion 43 having a substantially rectangular plate shape that covers the front opening 25 of the terminal accommodation cylindrical portion 23, the pivoting shaft 46 provided at an end portion of a long side of the cover portion 43, and a pick-up rib cover 45 provided at an end portion of a long side facing the pivoting shaft 46 of the cover portion 43. The connector cover 41 is rotatable between a closed position where the cover portion 43 covers the front opening 25 of the terminal accommodation cylindrical portion 23 and an open position where the cover portion 43 does not cover the front opening 25.

Figure 4:
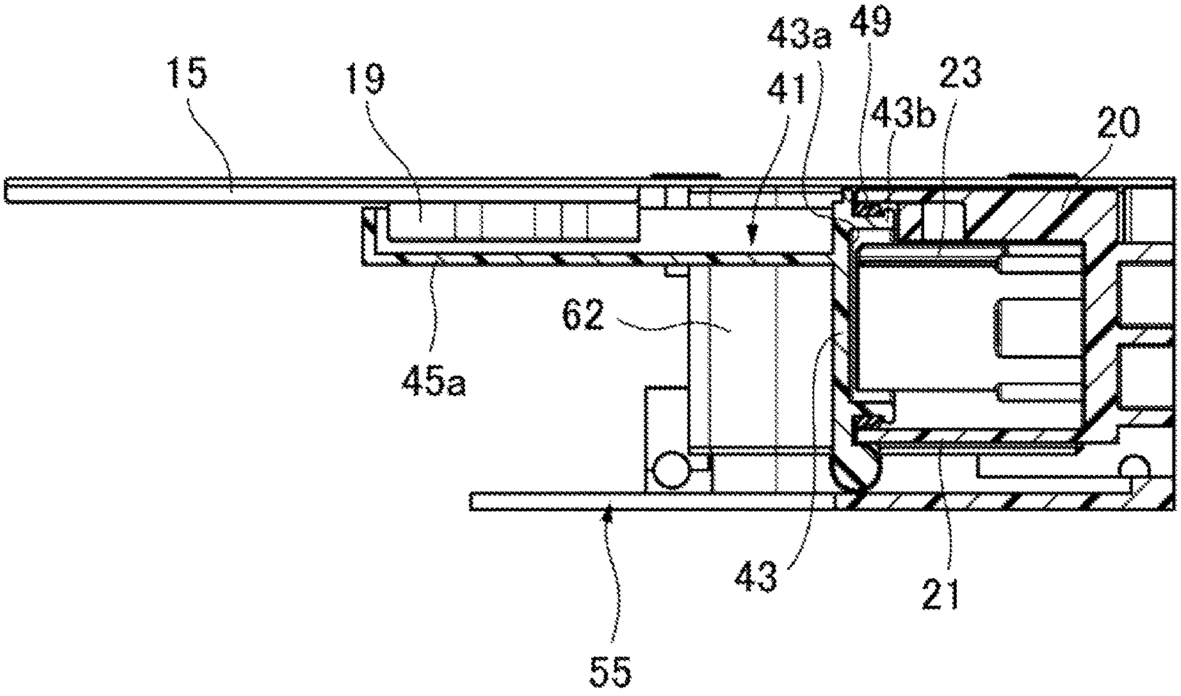
FIG. 4 is a cross-sectional view illustrating a state in which the connector cover of the inlet illustrated in FIG. 1 is closed.

As illustrated in FIG. 4, the cover portion 43 is provided with a cylindrical rib 43*b* along a shape of an opening edge of the hood portion 21 on a rear surface 43*a* side, and an elastic packing 49 is attached to an outer peripheral surface of the cylindrical rib 43*b*. The elastic packing 49 is molded from an elastic member such as sponge or rubber. The elastic packing 49 can elastically come into contact with the hood portion 21 of the housing 20 when the connector cover 41 is closed, that is, when the connector cover 41 is in the closed position (see FIG. 4). Therefore, it is possible to more reliably prevent dust, water, or the like from entering the front opening 25 of the housing 20.

The pick-up rib cover 45 is a plate-shaped member provided on a front surface side of the cover portion 43 and including the pick-up rib cover portion 45*a*. The pick-up rib cover 45 is displaceable between a covering position covering the pick-up rib 19 and an exposing position not covering the pick-up rib 19. The pick-up rib cover portion 45*a* can accommodate the pick-up rib 19 in a rectangular parallelepiped recess portion extending along the connector fitting direction and provided in a central portion of a plate member in the left-right direction. That is, the pick-up rib cover portion 45*a* is composed of a pair of side wall portions 45*al* and 45*al*, a front wall portion 45*a*2, a rear wall portion 45*a*3, and a bottom wall portion 45*a*4, which form the recess portion.

For example, the pivoting shaft 46 is made of metal and is integrally molded with the cover portion 43 and the pick-up rib cover 45 made of synthetic resin.

The inlet 1 is constructed as follows. The connector cover 41 is placed on the bottom plate portion 57 so that the pivoting shaft 46 is accommodated in the recess portions 58*a* of the support portions 58, and the side wall members 62 and 64 are placed on an upper surface of the bottom plate portion 57 so that the pivoting shaft 46 is accommodated in the recess portion 62*a*. The top plate 50 is placed on upper surfaces of the side wall members 62 and 64. Here, the side wall members 62 and 64 are respectively screwed to the pair of support portions 58 from the sides, and then the top plate 50 is screwed to the side wall members 62 and 64 from above to form the outer case 51. The housing 20 accommodating the connection terminals is inserted into the outer case 51 from behind, and the rear wall 26 of the housing 20 is screwed to the side wall members 62 and 64 from behind. The assembled inlet 1 is attached to, for example, a body of an electric vehicle via the top plate 50.

The inlet plug 5 includes plug-side connection terminals to be fitted to the connection terminals of the inlet 1, the plug housing 80 as an example of a first housing including a pair of terminal accommodation chambers 83 and 83 for accommodating the plug-side connection terminals, and a bracket 86 (see FIG. 1).

The plug housing 80 is molded from electrically insulating synthetic resin. The bracket 86 is attached to the plug housing 80.

The fitting guide groove 85 is formed on an upper surface of the plug housing 80. The fitting guide groove 85 includes a tapered portion of which a width increases gradually when closer to the inlet 1. The fitting guide groove 85 engages with the pick-up rib 19 when the inlet plug 5 is fitted to the inlet 1, thereby guiding the fitting of the plug housing 80 to the housing 20.

The terminal accommodation chamber 83 accommodates a connection terminal connected to a terminal portion of a high-voltage cable on the plug side (not illustrated). The high-voltage cable on the plug side connected to the connection terminal is pulled out from a rear end opening of the terminal accommodation chamber 83.

Next, a fitting operation of the inlet 1 and the inlet plug 5 described above will be described with reference to FIG. 4. FIG. 4 illustrates a cut surface along the fitting direction at a center of the inlet 1 in the left-right direction.

As illustrated in FIG. 4, when the inlet 1 and the inlet plug 5 are not fitted to each other, the connector cover 41 is in the closed position with the cover portion 43 covering the front opening 25 of the housing 20 (see FIG. 3). Therefore, the inlet 1 is dust-proof, terminal-protected, and electric-shock-proof. As illustrated in FIG. 4, the pick-up rib cover portion 45*a* is in the covering position covering the pick-up rib 19 when the inlet 1 and the inlet plug 5 are not fitted to each other. Therefore, the pick-up rib 19 of the inlet 1 is protected from damage and foreign matter adhesion. Therefore, the inlet 1 is prevented from interference with the fitting of the inlet plug 5. By preventing foreign matter from adhering to the pick-up ribs 19, entry of foreign matter adhering to the pick-up ribs 19 into the inlet plug 5 is prevented.

From a state illustrated in FIG. 4, when starting to insert and fit the inlet plug 5 into the inlet 1, the inlet 1 rotates the pivoting shaft 46 by the actuator 79 to pivot the cover portion 43 of the connector cover 41 to the open position where front opening 25 is not covered. Here, the pick-up rib cover portion 45*a* integrally provided with the cover portion 43 pivots to the exposing position where the pick-up rib 19 is not covered simultaneously as the cover portion 43 pivots. When the connector cover 41 is opened as such, the inlet 1 is in a state where the cover portion 43 is at the open position and the pick-up rib cover portion 45*a* is at the exposing position, as illustrated in FIG. 2. When the connector cover 41 is opened, both left and right sides of the cover portion 43 are in contact with left and right sides of the opening 57*a* of the bottom plate portion 57, and the pick-up rib cover 45 extends downward through the opening 57*a*. The connector cover 41 is preferably opened immediately before the inlet plug 5 is inserted and fitted into the inlet 1 from the viewpoints of protection of the pick-up rib 19, dust prevention, terminal protection, and electric shock prevention.

As illustrated in FIG. 2, the inlet plug 5 is moved to the inlet 1 side where the connector cover 41 is opened, and insertion and fitting of the plug housing 80 into the outer case 51 is started. Immediately after the start of fitting, the upper surface of the plug housing 80 abuts on the lower surface of the top plate 50 of the inlet 1, and the tip of the pick-up rib 19 is inserted into the fitting guide groove 85.

Here, when the inlet plug 5 is inserted deeply to advance toward the rear side of the inlet 1, the tip of the pick-up rib 19 is guided into the fitting guide groove 85 and a front end of the plug housing 80 hits the rear wall 26 of the housing 20. Then, the connection terminal of the inlet plug 5 is fitted and connected to the connection terminal of the inlet 1, whereby the high-voltage cable on the inlet 1 side and the high-voltage cable on the plug side are electrically connected and used. After use, the inlet plug 5 is detached from the inlet 1, and the actuator 79 rotates the pivoting shaft 46 in a reverse direction to bring the connector cover 41 into a closed state illustrated in FIG. 4. Here, the inside of the housing 20 is protected because the cover portion 43 is in the closed position.

According to the inlet 1, since the connector cover 41 includes the pick-up rib cover portion 45*a*, when the inlet plug 5 is not inserted and fitted into the inlet 1, the pick-up rib 19 is covered with the pick-up rib cover portion 45*a* and is not exposed. Therefore, the pick-up rib 19 is protected from damage and foreign matter adhesion. Therefore, it is possible to prevent the fitting of the inlet 1 and the inlet plug 5 from being interfered with, and to prevent foreign matter adhering to the pick-up rib 19 and entering the inlet plug 5.

Second Embodiment

Figure 5:
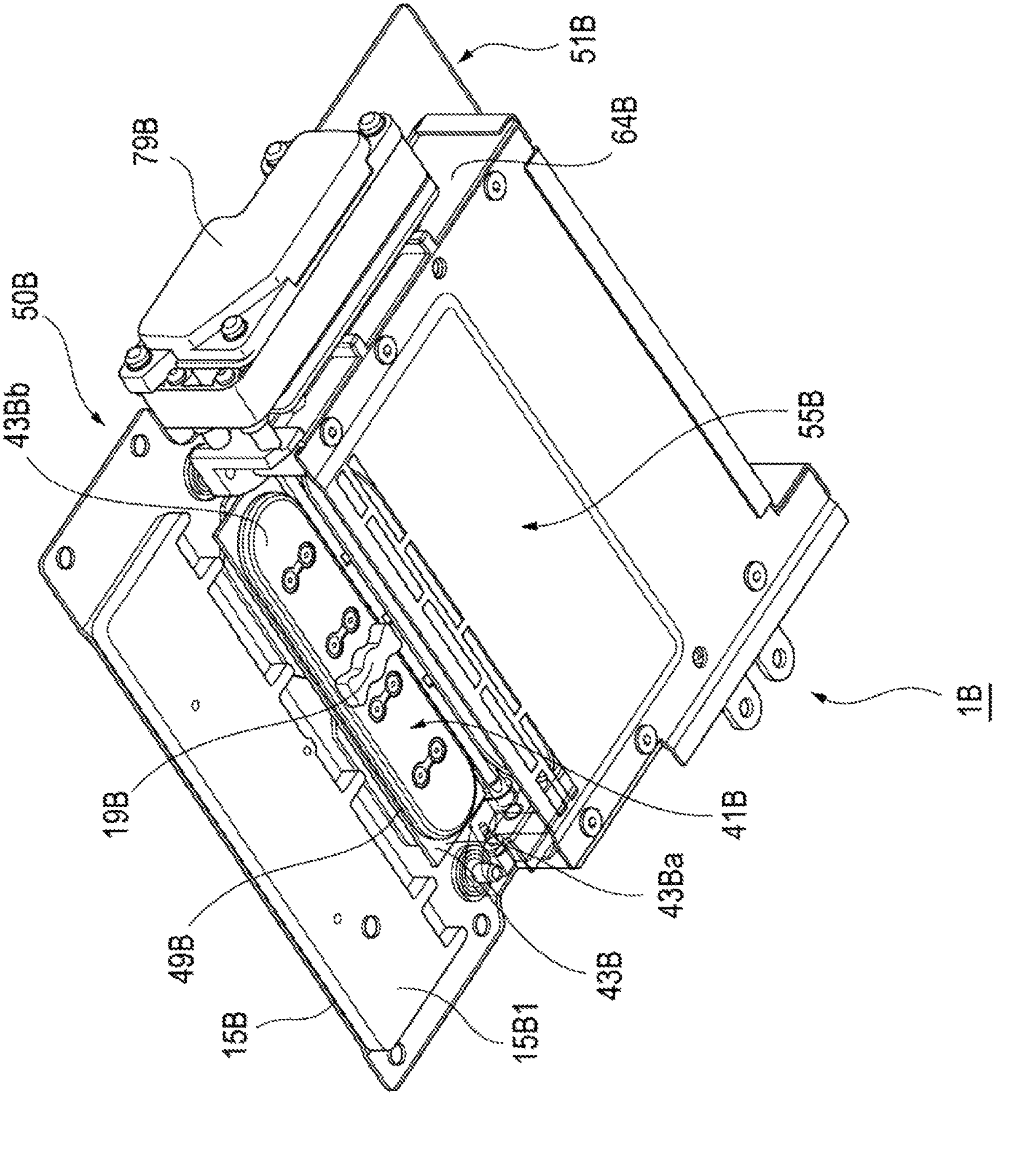
FIG. 5 is a perspective view illustrating an inlet as an example of a second connector forming a connector fitting structure according to a second embodiment of the present disclosure.
Figure 6:
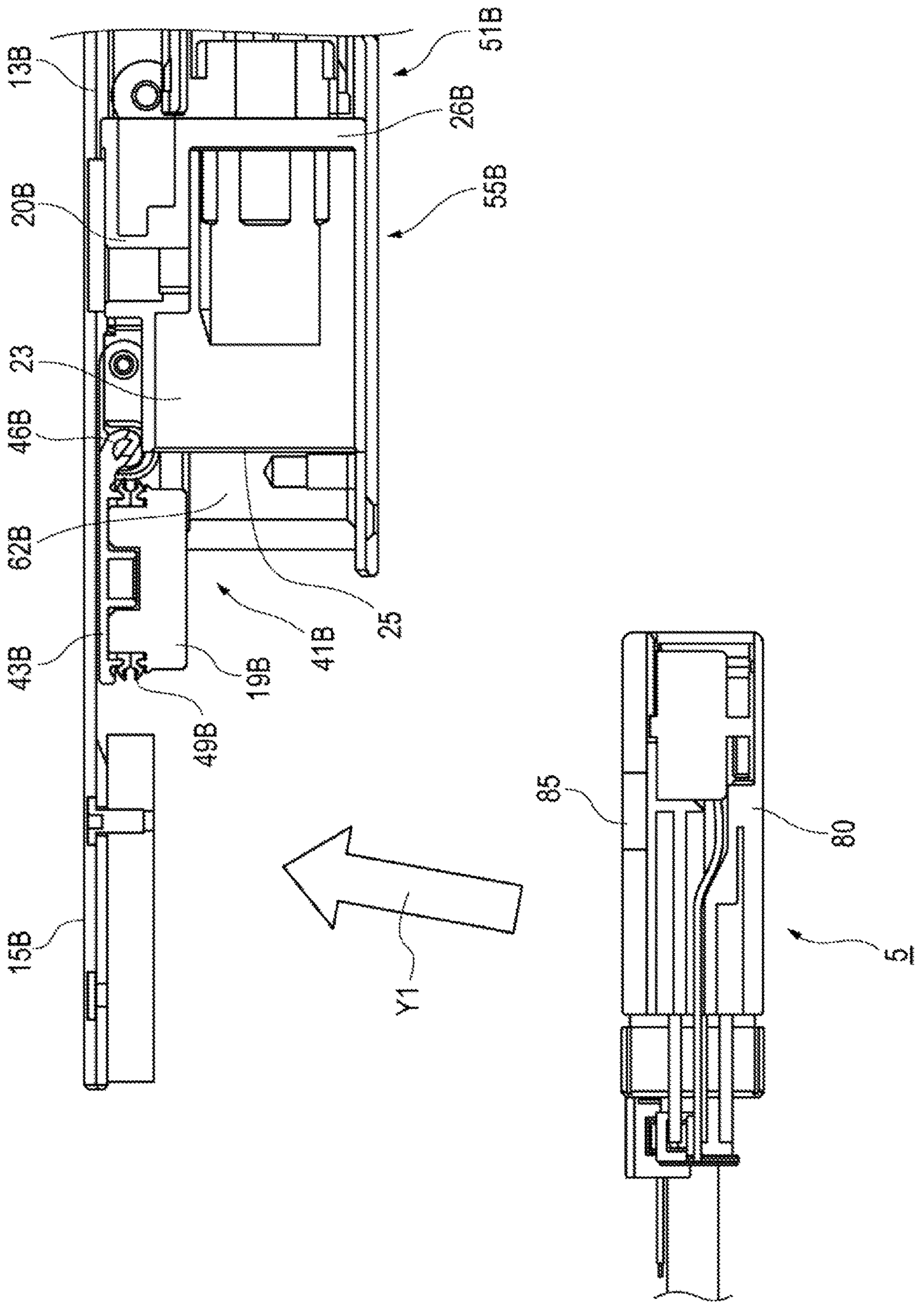
FIG. 6 is a cross-sectional view illustrating a state before the inlet and an inlet plug illustrated in FIG. 5 are fitted.
Figure 7:
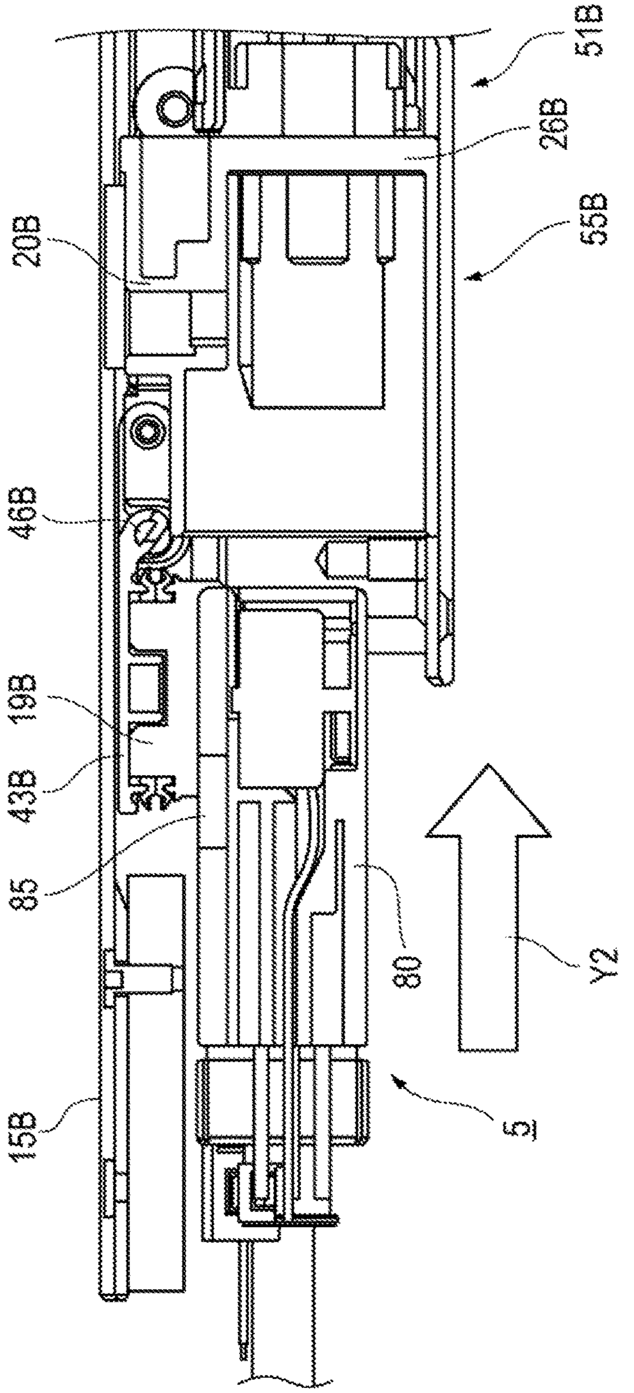
FIG. 7 is a cross-sectional view illustrating a state while fitting the inlet and the inlet plug illustrated in FIG. 5.
Figure 8:
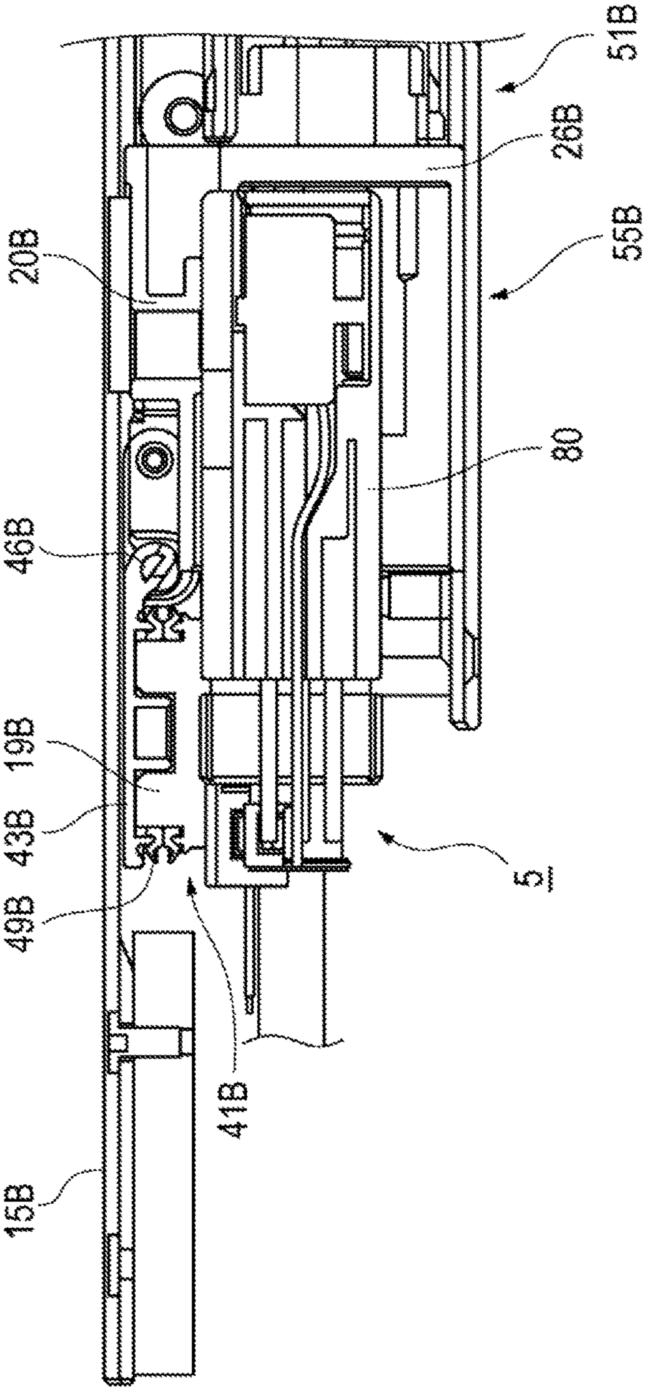
FIG. 8 is a cross-sectional view illustrating a state in which the inlet and the inlet plug illustrated in FIG. 5 are completely fitted.
Figure 9:
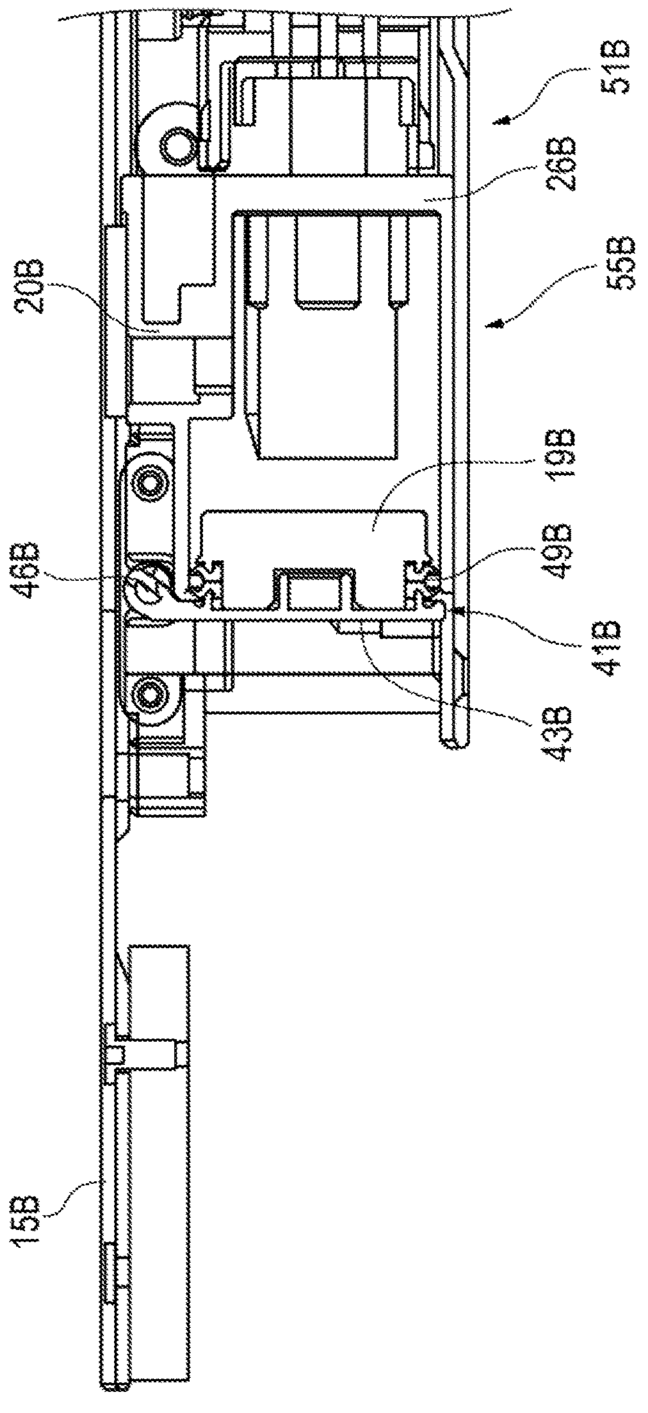
FIG. 9 is a cross-sectional view illustrating a state in which a cover of the inlet illustrated in FIG. 5 is closed.

FIG. 5 is a perspective view illustrating an inlet 1B as an example of a second connector forming a connector fitting structure according to a second embodiment of the present disclosure, illustrating a state in which a connector cover 41B of the inlet 1B is closed. The inlet plug 5 illustrated in FIG. 1 is inserted and fitted into the inlet 1B of the second embodiment. FIG. 6 is a cross-sectional view illustrating a state immediately after the inlet 1B illustrated in FIG. 5 and the inlet plug 5 illustrated in FIG. 1 are started to be fitted. FIG. 7 is a cross-sectional view illustrating a state while fitting the inlet 1B and the inlet plug 5. FIG. 8 is a cross-sectional view illustrating a state in which the inlet 1B and the inlet plug 5 are completely fitted. FIG. 9 is a cross-sectional view illustrating a state in which the connector cover 41B of the inlet 1B is closed. In the embodiment, members identical or equivalent to those illustrated in the first embodiment are denoted by identical or equivalent reference numerals.

The pick-up rib 19 is provided on the top plate 50 of the outer case 51 in the inlet 1 of the first embodiment. However, the inlet 1B of the second embodiment is mainly different in that the pick-up rib 19B is provided on the connector cover 41B.

The inlet 1B of the second embodiment, as illustrated in FIGS. 5 to 9, includes a housing 20B for accommodating a connection terminal (second connection terminal), an outer case 51B that accommodates and holds the housing 20B, a pick-up rib 19B, and the connector cover 41B. The outer case 51B is an example of the second housing. The pick-up rib 19B is an example of a guide protrusion portion. The pick-up rib 19B is provided on a lower surface (a cylindrical plate portion 43Bb of a cover portion 43B) of the connector cover 41B and is inserted into the fitting guide groove 85 that is an example of a guide groove. As the connector cover 41B pivots from a closed position covering the front opening 25 to an open position not covering the front opening 25, the pick-up rib 19B provided on the connector cover 41B pivots. By pivoting the connector cover 41B, the pick-up rib 19B is displaced from an accommodation position where the pick-up rib 19B is accommodated inside the housing 20B to an exposing position where the pick-up rib 19B is exposed to the outside of the housing 20B and extends along the connector fitting direction (left-right direction in FIGS. 6 to 9).

The housing 20B of the inlet 1B has the same configuration as the housing 20 of the inlet 1.

The outer case 51B is a flat housing composed of a bottom portion 55B, side wall members 62B and 64B, and a top plate 50B.

The bottom portion 55B differs from the bottom portion 55 in that the bottom portion 55B does not have a structure for supporting the pivoting shaft 46 of the connector cover 41, which is provided in the bottom portion 55 of the first embodiment.

The side wall members 62B and 64B differ from the side wall members 62 and 64 of the first embodiment in that the structure for supporting a pivoting shaft 46B of the connector cover 41B is provided above rather than below. An actuator 79B for rotationally driving the pivoting shaft 46B is screwed to the right side surface of the side wall member 64B.

The top plate 50B differs from the top plate 50 in that a thick plate portion 15B1 is provided on a lower surface of an eaves portion 15B.

The connector cover 41B includes the cover portion 43B having a substantially rectangular plate shape and covering the front opening 25 of the terminal accommodation cylindrical portion 23 of the housing 20B, and a pivoting shaft 46B provided at an upper end portion of a long side of the cover portion 43B. The connector cover 41B is pivotable between the closed position where the cover portion 43B covers the front opening 25 of the terminal accommodation cylindrical portion 23 and the open position where the cover portion 43B does not cover the front opening 25.

The cover portion 43B is provided with the cylindrical plate portion 43Bb along a shape of an opening edge of the hood portion 21 on a rear surface 43Ba side, and an elastic packing 49B is attached to an outer peripheral surface of the cylindrical plate portion 43Bb. The elastic packing 49B is molded with an elastic member such as sponge or rubber. In a central portion of the cylindrical plate portion 43Bb, the pick-up rib 19B for guiding the fitting of the plug housing 80 of the inlet plug 5 to the housing 20B accommodated in the outer case 51B extends along the connector fitting direction when the connector cover 41B is opened. When the connector cover 41B is closed, that is, when the connector cover 41B is in the closed position (see FIG. 9), the pick-up rib 19B is accommodated inside the housing 20B and the elastic packing 49B can elastically come into contact with a hood portion of the housing 20B. Therefore, it is possible to more reliably prevent dust, water, or the like from entering the front opening 25 of the housing 20B.

The inlet 1B is assembled in the same manner as the inlet 1 and attached to, for example, a body of an electric vehicle via the top plate 50B.

Next, a fitting operation of the inlet 1B and the inlet plug 5 will be described with reference to FIGS. 6 to 9. FIGS. 6 to 9 illustrate cut surfaces along the fitting direction at a center of the inlet 1B in the left-right direction.

As illustrated in FIG. 9, when the inlet 1B and the inlet plug 5 are not fitted to each other, the connector cover 41B is in the closed position where the cover portion 43B covers the front opening 25 of the housing 20B. Therefore, the inlet 1B is dust-proof, terminal-protected and electric-shock-proof. When the connector cover 41B is in the closed position, the pick-up rib 19B provided on the cylindrical plate portion 43Bb of the cover portion 43 is accommodated inside the housing 20B. Therefore, the inlet 1B protects the pick-up rib 19B from damage and foreign matter adhesion. Therefore, the inlet 1B is prevented from interference with the fitting of the inlet plug 5. By preventing foreign matter from adhering to the pick-up rib 19B, entry of the foreign matter adhering to the pick-up rib 19B into the inlet plug 5 is prevented. While the vehicle is traveling, the connector cover 41B is in the closed position and the pick-up rib 19B is accommodated inside the inlet 1, so the pick-up rib 19B can be prevented from being damaged or the adhesion of foreign matter. As a result, the inlet 1B and the inlet plug 5 can be securely fitted.

From the state illustrated in FIG. 9, when starting to insert and fit the inlet plug 5 into the inlet 1B, the inlet 1B pivots the cover portion 43B of connector cover 41B to the open position by the actuator 79B rotating the pivoting shaft 46B. The connector cover 41B is pivoted to the open position so that the upper surface of the cover portion 43B is disposed along the lower surface of the eaves portion 15B as illustrated in FIG. 6.

In the open state illustrated in FIG. 6, the connector cover 41B is pivoted to the open position where the front opening 25 is not covered, and the pick-up rib 19B provided on the cover portion 43B is exposed to the outside of the housing 20B and disposed to extend along the connector fitting direction. From the viewpoints of protection of the pick-up rib 19B, protection from dust, protection of terminals, and prevention of electric shock, it is preferable to open the connector cover 41B immediately before inserting and fitting the inlet plug 5 into the inlet 1B.

The inlet plug 5 is moved in a Y1 direction illustrated in FIG. 6 with respect to the inlet 1B with the connector cover 41B opened, and the plug housing 80 starts to be inserted and fitted into the outer case 51B. During fitting illustrated in FIG. 7, the upper surface of the plug housing 80 is close to the lower surface of the top plate 50B of the inlet 1, and the pick-up rib 19B is inserted into the fitting guide groove 85.

When the inlet plug 5 is inserted deeply to advance to a rear side (in a Y2 direction illustrated in FIG. 7) of the inlet 1B, the tip of the pick-up rib 19B is guided into the fitting guide groove 85, and thus a front end of the plug housing 80 hits the rear wall 26B of the housing 20B (see FIG. 8). Here, the connection terminal of the inlet plug 5 is fitted and connected to the connection terminal of the inlet 1B, whereby the high-voltage cable on the inlet 1B side and the high-voltage cable on the plug side are electrically connected for use. After use, the inlet plug 5 is removed from the inlet 1B. Then, the connector cover 41B is closed by the actuator 79B rotating the pivoting shaft 46B in a reverse direction (see FIG. 9). Here, the inside of the housing 20B is protected since the cover portion 43B is in the closed position.

According to the inlet 1B, when the inlet plug 5 is not inserted and fitted into the inlet 1B, the pick-up rib 19B provided on the cover portion 43B is accommodated inside the housing 20B and is not exposed. As a result, the pick-up rib 19B is protected from damage and foreign matter adhesion. Therefore, the fitting between the inlet 1B and the inlet plug 5 is prevented from being hindered, and foreign matter attached to the pick-up rib 19B is prevented from entering the inlet plug 5. Thus, a fitting operation between the inlet 1B and the inlet plug 5 can be reliably performed.

The present disclosure is not limited to the above-described embodiments, and can be modified, improved, and the like as appropriate. The material, shape, size, number, location, and the like of each component in the above-described embodiments are arbitrary and not limited as long as the present disclosure can be achieved.

For example, in the above-described embodiments, an inlet used in an electric vehicle or the like is described as an example of a connector, but the connector of the present disclosure is not limited thereto and can be applied to various connectors based on the gist of the present disclosure.

Here, features of the embodiments of the connector fitting structure according to the present disclosure described above are briefly summarized below.

[1] A connector fitting structure of a first connector (inlet plug 5) and a second connector (inlet 1B) that are fitted and electrically connected to each other, where
- the first connector (inlet plug 5) includes
- a first housing (plug housing 80) that accommodates a first connection terminal, and
- a guide groove (fitting guide groove 85) provided in the first housing,
- the second connector (inlet 1B) includes
- a second housing (outer case 51B) that accommodates a second connection terminal,
- a guide protrusion portion (pick-up rib 19B) that is inserted into the guide groove, and
- a connector cover (41B) pivotable between a closed position that covers an opening (first opening 25) to an accommodation space for the second connection terminal of the second housing and an open position that does not cover the opening, and
- the guide protrusion portion is provided on the connector cover, accommodated in the second housing when the connector cover is in the closed position, and exposed outside the second housing and extended along a fitting direction of the first connector and the second connector when the connector cover is in the open position.

According to the connector fitting structure having the configuration of [1], when the first connector and the second connector are not fitted to each other, the guide protrusion portion is accommodated in the second housing and is not exposed, so that the guide protrusion portion is protected from damage and adhesion of foreign matter. Therefore, such configuration prevents interference with the fitting of the first connector and the second connector, and prevents foreign matter attached to the guide protrusion portion from entering the first connector.

[2] The connector fitting structure according to [1], where
- in the second connector (inlet 1B),
- the connector cover (41B) includes a cover portion (43B) that covers the opening (front opening 25) and a pivoting shaft (46B) that is provided on an upper edge portion of the cover portion, and
- the guide protrusion portion (pick-up rib 19B) is provided to protrude downward from the cover portion when the connector cover is in the open position, and
- in the first connector (inlet plug 5),
- the guide groove (fitting guide groove 85) is provided on an upper surface of the first housing (plug housing 80).

According to the connector fitting structure having the configuration of [2], by bringing the first connector close to the second connector from below the second connector in which the connector cover is pivoted upward and is in the open position and inserting the guide protrusion portion into the guide groove, the first connector and the second connector can be favorably fitted to each other.

What is claimed is:

1. A connector fitting structure comprising:
- a first connector including:
  - a first housing that accommodates a first connection terminal; and
  - a guide groove provided in the first housing;
- a second connector including:
  - a second housing that accommodates a second connection terminal;
  - a guide protrusion portion that is inserted into the guide groove; and
  - a connector cover pivotable between a closed position that covers an opening to an accommodation space for the second connection terminal of the second housing and an open position that does not cover the opening, wherein:
- the first connector and the second connector are fitted and electrically connected to each other; and
- the guide protrusion portion is provided on the connector cover, accommodated in the second housing when the connector cover is in the closed position, and exposed outside the second housing and extended along a fitting direction of the first connector and the second connector when the connector cover is in the open position.

2. The connector fitting structure according to claim 1, wherein:
- in the second connector, the connector cover includes a cover portion that covers the opening and a pivoting shaft that is provided on an upper edge portion of the cover portion, and the guide protrusion portion is provided to protrude downward from the cover portion when the connector cover is in the open position; and
- in the first connector, the guide groove is provided on an upper surface of the first housing.

3. The connector fitting structure according to claim 1, wherein:
- the guide protrusion extends through the opening of the second housing when the first connector is disconnected from the second connector and the connection cover is in the closed position; and
- the guide protrusion is spaced away from the opening when the connection cover is opened position.

4. The connector fitting structure according to claim 1, wherein:
- the guide protrusion protrudes from the connector cover in a first direction when the connector cover is in the closed position and in a second direction when the connector cover is in the open position;

the second direction intersects the first direction; and the first housing extends through the opening in the first direction when the first connector and the second connector are fitted and electrically connected to each other.

5. The connector fitting structure according to claim 1, further comprising:

an elastic packing mounted on the connection cover and sealing the opening when the connection cover is in the closed position.

* * * * *